US011467340B2

(12) United States Patent
Hasegawa (10) Patent No.: US 11,467,340 B2
(45) Date of Patent: Oct. 11, 2022

(54) OPTICAL FIBER (71) Applicant: SUMITOMO ELECTRIC INDUSTRIES, LTD., Osaka (JP)

(72) Inventor: Takemi Hasegawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 119 days.

(21) Appl. No.: 17/121,160

(22) Filed: Dec. 14, 2020

(65) Prior Publication Data

US 2021/0096297 A1   Apr. 1, 2021

Related U.S. Application Data (63) Continuation of application No. PCT/JP2019/026189, filed on Jul. 1, 2019.

(30) Foreign Application Priority Data

Jul. 2, 2018 (JP) .............................. JP2018-125924

(51) Int. Cl.
G02B 6/036   (2006.01)
C03B 37/027  (2006.01)
C03C 13/04   (2006.01)
G02B 6/44    (2006.01)

(52) U.S. Cl.
CPC ............ G02B 6/036 (2013.01); C03B 37/027 (2013.01); C03C 13/046 (2013.01); G02B 6/44 (2013.01)

(58) Field of Classification Search
None
See application file for complete search history.

(56) References Cited

U.S. PATENT DOCUMENTS

| 6,542,683 | B1 | 4/2003 | Evans et al. |
| 8,965,162 | B2 * | 2/2015 | Dragic ............... G02B 6/03694 |
| | | | 385/141 |
| 2004/0218882 | A1 | 11/2004 | Bickham et al. |
| 2006/0171648 | A1 | 8/2006 | Hasegawa |
| 2006/0285809 | A1 | 12/2006 | Bickham et al. |
| 2007/0116416 | A1 | 5/2007 | Chen et al. |
| 2008/0008432 | A1 | 1/2008 | Dragic |
| 2009/0263092 | A1 | 10/2009 | Flammer et al. |

(Continued)

FOREIGN PATENT DOCUMENTS

JP        2008-158227 A    7/2008

OTHER PUBLICATIONS

R. M. Shelby et al., "Guided acoustic-wave Brillouin scattering," PhysicalReview B, vol. 31, No. 8, 1985, p. 5244-p. 5252.

(Continued)

*Primary Examiner* — Chris H Chu
(74) *Attorney, Agent, or Firm* — Faegre Drinker Biddle & Reath LLP (57) ABSTRACT

An optical fiber according to an embodiment includes a core, a cladding, and a coating layer. At the boundary between the core and the cladding, the local sound velocity decreases in the direction from the core side toward the cladding side. At least in the cladding, the local sound velocity changes continuously in a radial direction. Further, the line width of the Brillouin gain of the light beam guided by the fundamental mode is 60 MHz or more.

8 Claims, 5 Drawing Sheets (56) References Cited

U.S. PATENT DOCUMENTS

2011/0280584 A1    11/2011    Tankala et al.

OTHER PUBLICATIONS

M. A. Bolshtyansky et al., "Impact of Spontaneous Guided Acoustic-Wave Brillouin Scattering on Long-haul Transmission," OpticalFiber Communications Conference, 2018, pM4B.3.
Hayashi, Neisei et al., "Experimental observation of depolarized GAWBS in partially uncoated optical fibre," 2017 22nd Microoptics Conference (MOC), The Japan Society of Applied Physics, 2017, p. 356-p. 357.

\* cited by examiner

OPTICAL FIBER

CROSS-REFERENCE TO RELATED APPLICATIONS

This application is a continuation application of PCT/JP2019/026189 claiming the benefit of priority of the Japanese Patent Application No. 2018-125924 filed on Jul. 2, 2018, the entire contents of which are incorporated herein by reference.

TECHNICAL FIELD

The present disclosure relates to optical fibers.

BACKGROUND ART

Stimulated Brillouin scattering (SBS) in an optical fiber is an interaction among the light beam being guided in a first direction (first guided light beam), the light beam being guided in a second direction that is the reverse of the first direction (second guided light beam), and the acoustic waves propagating in the first direction. This SBS causes power transfer from the first guided light beam to both the second guided light beam and the acoustic waves, and also causes waveform distortion in the first guided light beam. Therefore, SBS is a factor that limits transmission performance in transmission of high-power light beam or transmission of signal light beam. Patent Documents 1 to 6 disclose optical fibers designed to reduce SBS.

In Patent Document 1, fluorine (F) and phosphorus (P) are mentioned as dopants for adjusting the viscosity and the thermal expansion coefficient in an optical fiber mainly comprised of silica glass. Patent Document 2 discloses that silica glass containing $GeO_2$ is used as an optical core, and F is doped, as well as $GeO_2$, to part of the region of the optical core. Patent Document 3 discloses that silica glass containing $GeO_2$ is used as an optical core, and $Al_2O_3$ is doped, as well as $GeO_2$, to part of the region of the optical core. Patent Document 4 discloses a core structure including a central region, an intermediate region, and an external region. Patent Document 4 also discloses that, where the maximum value of the relative refractive index difference in the central region is represented by Δ1max, the minimum value of the relative refractive index difference in the intermediate region is represented by Δ2min, and the maximum value of the relative refractive index difference in the external region is represented by Δ3max, the following relationship is established: Δ1max>Δ2min, and Δ3max>Δ2min Patent Document 5 discloses that an annular acoustic core can be formed with a concentration distribution of $GeO_2$ or F doped to silica glass, which is the primary component of the core. Patent Document 6 discloses a structure including a trench layer in which the core mainly comprised of silica glass contains at least two kinds of dopants, the concentration of at least one of the two kinds of dopants changes continuously in a radial direction, and F is doped to the cladding surrounding the core. Fe, F, P, Al, Cl, B, N, and alkali metals are disclosed as dopants in the core.

CITATION LIST

Patent Literatures

Patent Document 1: U.S. Pat. No. 6,542,683
Patent Document 2: US 2006/0285809 A1
Patent Document 3: US 2007/0116416 A1
Patent Document 4: US 2004/0218882 A1
Patent Document 5: US 2006/0171648 A1
Patent Document 6: US 2009/0263092 A1 Non Patent Literatures Non-Patent Document 1: R. M. Shelby et al., Physical Review B, Vol. 31, No. 8, pp. 5244-5252 (1985)
Non-Patent Document 2: M. Bolshtyansky, et al., Optical-Fiber Communications Conference 2018 (OFC2018) M4B.3 (2018)

SUMMARY OF INVENTION

An optical fiber of the present disclosure includes: a core that extends along a fiber axis and is mainly comprised of silica glass; a cladding that surrounds the core and is mainly comprised of silica glass; and a coating layer that surrounds the cladding and is comprised of a resin material. The core is mainly comprised of silica glass. The cladding has a refractive index lower than the refractive index of the core. Particularly, in the glass region including the boundary between the core and the cladding, the local sound velocity decreases in the direction from the side of the core toward the side of the cladding. At least in the cladding, the local sound velocity changes continuously in the radial direction from the fiber axis toward the outer peripheral surface of the cladding. Further, the line width of the Brillouin gain of a light beam guided by a fundamental mode is 60 MHz or more.

DESCRIPTION OF EMBODIMENTS

Solution to Problem

The technique according to Patent Document 1 forms non-uniform viscosity and thermal expansion coefficient in a radial direction in the core of an optical fiber, to increase the frequency spectrum width of SBS, and thus, reduce SBS. Both the techniques according to Patent Documents 2 and 3 make sound velocity non-uniform in the core of an optical fiber, to reduce SBS. The technique according to Patent Document 4 adjusts the concentration distribution of $GeO_2$ to be doped to silica glass, which is the primary component of the core, to expand the acousto-optical effective area indicating the smallness of the overlap between a fundamental optical mode and a plurality of acoustic modes guided in an optical fiber. SBS is reduced by such an increase in the acousto-optical effective area. By the technique according to Patent Document 5, an annular acoustic core is formed in part of the optical core, and the sound velocity varies between an acoustic mode localized inside the annular acoustic core and an acoustic mode localized outside the annular acoustic core. The difference in sound velocity between the acoustic modes increases the spectrum width of Brillouin gain, resulting in a decrease in SBS. Note that the trench layer by the technique according to Patent Document 6 has an effect of reducing bending loss in the fundamental waveguide mode.

A conventional technique designed to reduce SBS in an optical fiber as described above has a problem that the optical transmission loss in the fundamental waveguide mode increases with a decrease in SBS. This is due to the fact that, in the conventional technique, the composition and the physical properties of the optical core are made non-uniform so that the sound velocities of a plurality of acoustic modes are made non-uniform. That is, to make the composition and the physical properties of the optical core non-uniform, the amount of the dopant is increased, and the interface between glass regions having different compositions is increased. As a result, optical loss due to the dopant or the interface becomes larger.

Therefore, the present disclosure aims to provide an optical fiber capable of reducing both SBS and an increase in transmission loss.

Advantageous Effects of Invention

With an optical fiber of the present disclosure, both SBS and an increase in transmission loss can be reduced.

DESCRIPTION OF EMBODIMENTS OF THE PRESENT DISCLOSURE

First, details of embodiments of the present disclosure are listed and described one by one.

(1) An optical fiber as one aspect of the present disclosure includes a core extending along a fiber axis, a cladding surrounding the core, and a coating layer that surrounds the cladding and is comprised of a resin material. The core is mainly comprised of silica glass. The cladding is mainly comprised of silica glass, and has a refractive index lower than the refractive index of the core. Further, in the optical fiber of the present disclosure, the concentration distribution of the dopant is adjusted so that the local sound velocity in the optical fiber is controlled. Specifically, in the glass region including the boundary between the core and the cladding, the local sound velocity decreases in the direction from the side of the core toward the side of the cladding. At least in the cladding, the local sound velocity changes continuously in the radial direction from the fiber axis toward the outer circumferential surface of the cladding. Further, the line width of the Brillouin gain of a light beam guided by a fundamental mode is 60 MHz or more. Here, a "local sound velocity" in the present disclosure means the sound velocity in a uniform medium having the same physical properties as the local physical properties. Also, the "line width of the Brillouin gain" means the full width at half maximum of a gain that is received by a second guided light beam due to SBS caused between a first guided light beam guided by the fundamental mode and the second guided light beam propagating in the opposite direction to the first light beam and that is expressed as a function of the optical frequency difference between the first guided light beam and the second guided light beam.

(2) In one aspect of the present disclosure, it is preferable that at least the cladding contains a metallic dopant that lowers sound velocity in a state in which the concentration of fluorine in the cladding is set higher than the concentration of fluorine in the core. In this case, the concentration of the metallic dopant in the cladding preferably decreases continuously in a radial direction. Alternatively, in one aspect of the present disclosure, the core and the cladding may contain a metallic dopant that increases sound velocity in a state in which the concentration of fluorine in the cladding is set higher than the concentration of fluorine in the core. In this case, the concentration of the metallic dopant in the core and the cladding preferably decreases continuously in a radial direction. Preferred examples of the metallic dopant include alkali metals such as lithium, sodium, potassium, and rubidium, alkaline-earth metals such as beryllium, magnesium, calcium, strontium, and barium, and mixtures of any of these metals. These metallic dopants facilitate structural relaxation of glass and reduce density fluctuations. As a result, transmission loss can be effectively reduced, and SBS can be effectively reduced by changes in sound velocity, as will be described later.

(3) In one aspect of the present disclosure, the optical fiber may have an edge portion that is closest to the fiber axis and is a part of the doped region in which the concentration of the metallic dopant drops in the cladding to 0.1 times the metallic dopant concentration at the boundary (the boundary between the core and the cladding), and a position of the edge portion is separated from the boundary by 5 μm or more in the radial direction. Also, the concentration of the metallic dopant at the above-mentioned boundary is preferably 0.1 ppm or higher. Further, in one aspect of the present disclosure, the core is preferably substantially free of $GeO_2$ (or is designed to contain substantially no $GeO_2$).

(4) In one aspect of the present disclosure, the minimum transmission loss of the light beam guided by the fundamental mode is preferably 0.17 dB/km or less. Further, in one aspect of the present disclosure, the coating layer may be formed with a plurality of layers. In this case, the loss tangent tan δ is preferably 0.3 or more in the innermost layer of the plurality of layers. Note that, in the measurement of the loss tangent in the coating layer of an optical fiber, a strain that changes with time is applied to the object, and the stress generated in the object is measured. In this manner, the storage elastic modulus and the loss elastic modulus of the object are calculated, and the modulus ratio is determined.

Each of the respective aspects listed above in Description of Embodiments of the Present Disclosure can be applied to each of all the remaining aspects, or to all combinations of these remaining aspects.

DETAILED DESCRIPTION OF EMBODIMENTS OF THE PRESENT DISCLOSURE

The following is a detailed description of specific structures of optical fibers according to embodiments of the present disclosure, with reference to the accompanying drawings. Note that the present disclosure is not limited to these examples, but is shown by the scope of claims and is intended to include all modifications within the spirit and scope equivalent to the scope of claims. Further, in the description of the drawings, like components are denoted by like reference numerals, and explanation of them will not be repeated.

The definitions of the terms used in this specification and the claims are as follows.

Where the sound velocity of longitudinal waves in pure silica glass is represented by $V_0$, and the sound velocity of longitudinal waves in a medium is represented by V, the relative acoustic refractive index difference Δa of the medium is defined by the following equation:

$$\Delta a = (V_0/V) - 1$$

This is the same as the definition disclosed in column 6 of Patent Document 5 mentioned above.

Where the refractive index of pure silica glass is represented by no, and the refractive index of a medium is represented by n, the relative optical refractive index difference Δ of the medium is defined by the following equation:

$$\Delta = (n/n_0) - 1$$

This is the same as the definition disclosed in column 5 of Patent Document 5 mentioned above. Note that, in the description below, in a case where it is clear from the context, the word "optical" is sometimes omitted, and "relative optical refractive index difference" is sometimes referred to simply as "relative refractive index difference".

A case where a region is defined by a difference in the level of certain physical quantities that change continuously and is differentiable in space. The boundary of the region is defined by the interface formed by connecting microplanes orthogonal to the differential vector (gradient) at the point where the magnitude of the spatial differential vector of the physical quantities is maximized. For example, the boundary between a core that is rotationally symmetric and has a high refractive index, and a cladding that has a low refractive index is defined by the radius at which the derivative of the refractive index with respect to the radius is minimized (the negative value that maximizes the absolute value).

Unless otherwise specified, the concentration of the dopant to be doped to silica glass, which is the primary component of an optical fiber, is expressed as the ratio of the number of atoms or molecules of the dopant to the number of atoms of Si.

Figure 1:
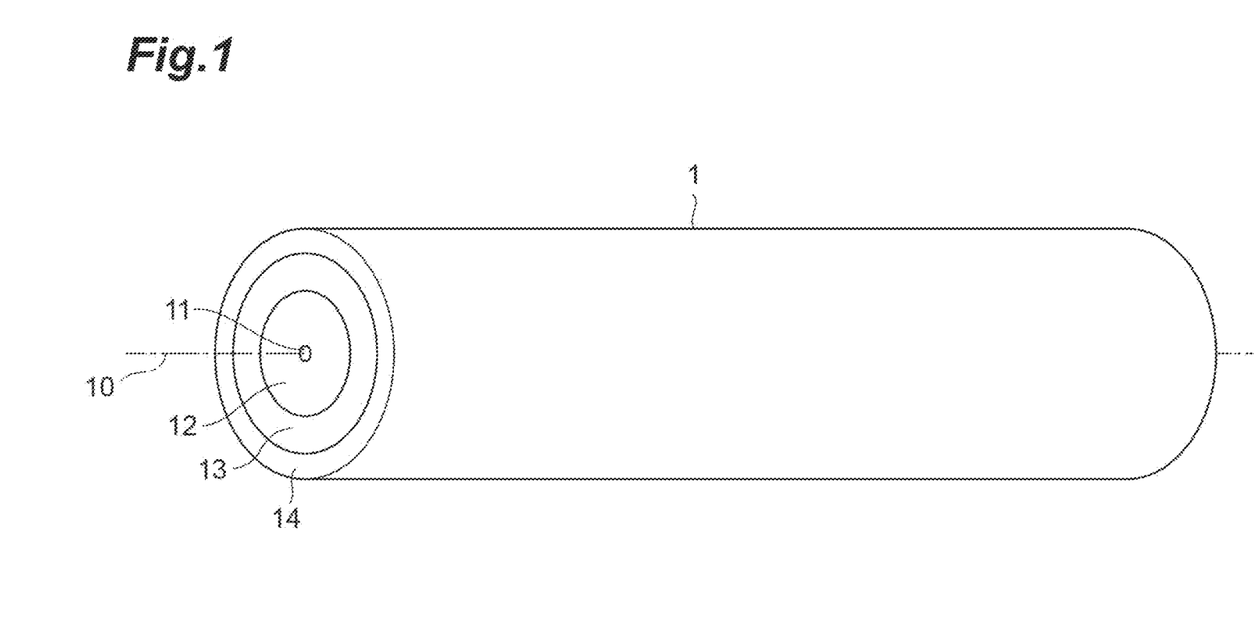
FIG. 1 is a diagram showing a typical structure of an optical fiber according to an embodiment of the present disclosure.

FIG. 1 is a diagram showing a typical structure of an optical fiber 1 according to an embodiment of the present disclosure. The optical fiber 1 includes a core 11 extending along a fiber axis 10, a cladding 12 surrounding the core 11, a first coating layer 13 surrounding the cladding 12, and a second coating layer 14 surrounding the first coating layer 13. The core 11 and the cladding 12 are mainly comprised of silica glass. The first coating layer 13 and the second coating layer 14 are coating layers comprised of a resin material. Although FIG. 1 shows the optical fiber 1 having the single core 11, an optical fiber of the present disclosure may have a plurality of cores that are arranged to include the fiber axis 10 or surround the fiber axis 10.

The core 11 is preferably formed with virtually $GeO_2$-free (or Ge-free) silica glass. In conventional technologies, an optical fiber core designed to reduce SBS normally contains Ge, but Ge slightly increases transmission loss. Therefore, in the optical fiber 1 of the present disclosure, it is preferable that the core 11 is substantially free of $GeO_2$.

The core 11 preferably contains Cl, F, Br, or a metallic dopant, and has a relatively low viscosity on average compared with pure silica glass. Because of this, when a preform that is the precursor to an optical fiber is drawn to produce the optical fiber, the tensile force remaining in the core is reduced, and the glass structural relaxation at the time of drawing is facilitated. Thus, an effect to reduce transmission loss is achieved.

The cladding 12 is preferably a silica glass layer containing F. Accordingly, the cladding 12 has a lower refractive index on average than that of the core 11. The relative refractive index difference between the core 11 and the cladding 12 is 0.2% or more and 0.6% or less, and the diameter of the core is 8 μm or more and 20 μm or less. With such a configuration, it is possible to perform optical transmission at a wavelength of 1.5 μm to 1.6 μm, which has a single waveguide mode at a wavelength of 1530 nm and is suitable for long-haul communication. The cladding 12 also preferably has a standard outer diameter of 124 μm or more and 126 μm or less.

The first coating layer 13 and the second coating layer 14 are comprised of a urethane-acrylate-based ultraviolet curable resin. More preferably, the first coating layer 13 has a thickness of 15 μm to 40 μm, and an elastic modulus of 0.05 MPa to 0.5 MPa. Also, the second coating layer 14 has a thickness of 15 μm to 40 μm, and an elastic modulus of 500 MPa to 2000 MPa. With this arrangement, external force applied from sides is effectively blocked (external force application to the glass of the core 11 and the cladding 12 is effectively blocked).

First Embodiment

Figure 2:
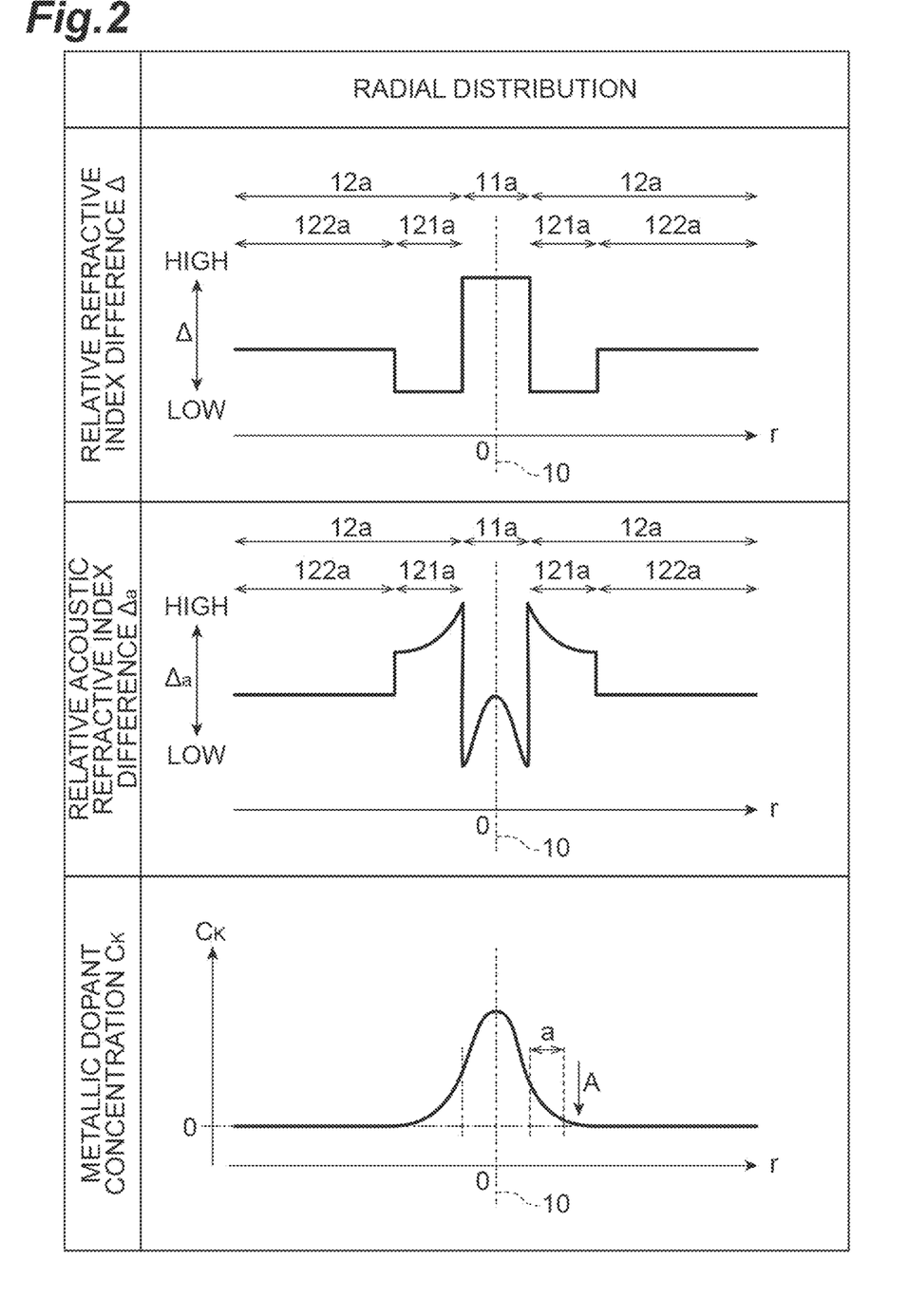
FIG. 2 is a diagram showing the respective radial distributions of the relative optical refractive index difference Δ, the relative acoustic refractive index difference Δa, and the metallic dopant concentration $C_K$ in an optical fiber of a first embodiment.

FIG. 2 is a diagram showing the respective radial distributions of the relative optical refractive index difference Δ, the relative acoustic refractive index difference Δa, and the metallic dopant concentration $C_K$ in an optical fiber according to a first embodiment. The optical fiber according to the first embodiment has the same cross-sectional structure as that of the optical fiber 1 shown in FIG. 1. However, the metallic dopant contained in the optical fiber according to the first embodiment has the effect of lowering the sound velocity and increasing the relative acoustic refractive index difference. For example, barium is known as such a dopant. Note that the radial distributions shown in FIG. 2 correspond to the radial distributions in a cross-section perpendicular to the fiber axis 10 in the optical fiber 1 in FIG. 1.

The optical fiber according to the first embodiment (FIG. 2) includes a core 11a and a cladding 12a. The cladding 12a includes a first cladding 121a that directly surrounds the core 11a, and a second cladding 122a that surrounds the first cladding 121a. The magnitude relationship among these glass regions in terms of the relative optical refractive index difference Δ satisfies the following:

$$\Delta(\text{core}) > \Delta(\text{first cladding})$$

$$\Delta(\text{first cladding}) \leq \Delta(\text{second cladding})$$

Such a refractive index distribution is achieved when the fluorine concentration $C_F$ in each glass region satisfies the following relationship:

$$C_F(\text{core}) < C_F(\text{first cladding})$$

$$C_F(\text{first cladding}) \geq C_F(\text{second cladding})$$

To keep the Rayleigh scattering loss due to concentration fluctuations, the fluorine concentration $C_F$ in the core 11a is preferably 4000 ppm or lower. Further, to lower the viscosity of the core 11a, facilitate the structural relaxation during the drawing, and keep the Rayleigh scattering loss due to density fluctuations, the fluorine concentration $C_F$ in the core 11a is preferably 1000 ppm or higher.

The difference between the relative optical refractive index difference of the core 11a and the relative optical refractive index difference of the first cladding 121a (Δ (core)−Δ (first cladding)) is preferably 0.5% or lower, to keep the transmission loss due to the structural irregularity of the interface at low level. Further, this difference (Δ (core)−Δ (first cladding)) is preferably 0.2% or higher, to keep the transmission loss in fundamental mode due to bending at low level.

The difference between the relative optical refractive index difference of the second cladding 122a and the relative optical refractive index difference of the first cladding 121a (Δ (second cladding)−Δ (first cladding)) is preferably 0.05% or higher, to increase the bending loss in high-order mode and keep the noise due to high-order mode light beam at low level. Further, this difference (Δ (second cladding)−Δ (first cladding)) is preferably 0.2% or lower, to keep the transmission loss in the fundamental mode due to bending at low level.

The ratio between the outer radius of the first cladding 121a and the radius of the core 11a (r (first cladding)/r (core)) is preferably 2.0 or higher, to keep the transmission loss due to the low-cost glass of the second cladding 122a at low level. Further, this ratio (r (first cladding)/r (core)) is preferably 5.0 or lower, to increase the bending loss in the high-order mode and keep the noise due to high-order mode light beam at low level.

The metallic dopant is widely distributed in both the core 11a and the first cladding 121a. The distribution of the metallic dopant concentration $C_K$ has such a profile as to reach its maximum value substantially at the center (the fiber axis 10) of the core 11a, and decrease in the direction from the core 11a toward the second cladding 122a in the first cladding 121a (or decrease in the radial direction). The metallic dopant in the first embodiment lowers the sound velocity V of the silica glass together with fluorine, to increase the relative acoustic refractive index difference Δa.

In the first embodiment, in the glass region including the boundary between the core 11a and the cladding 12a, the local sound velocity drops in the direction from the side of the core 11a toward the side of the cladding 12a. In the cladding 12a, the local sound velocity changes continuously in the radial direction. Further, the line width of the Brillouin gain of the guided light beam in the fundamental mode is 60 MHz or more. Furthermore, the position of the edge portion closest to the fiber axis 10 at a portion of the doped region in which the concentration of the metallic dopant in the cladding 12a drops to 0.1 times the concentration of the metallic dopant at the boundary is preferably at a distance of 5 μm or more from the boundary. Further, the concentration of the metallic dopant at the boundary is preferably 0.1 ppm or higher.

As shown in FIG. 2, the distribution of the relative acoustic refractive index difference Δa has such a shape as to have a maximum value at the center (the fiber axis 10) of the core 11a, and a maximum value at the boundary between the core 11a and the first cladding 121a. Each of these two positions at which the relative acoustic refractive index difference Δa has a maximum value serves as a core (acoustic core) for acoustic waves. Because of this, the existence of the acoustic mode localized in each acoustic core causes a decrease in the degree of overlap between the individual acoustic modes and the fundamental waveguide mode of light beam, as described in column 7 of Patent Document 5 mentioned above. As a result, SBS is reduced.

In the optical fiber of Patent Document 5 mentioned above, two acoustic cores are formed by the fluorine concentration distribution formed in the core. However, this involves high-concentration fluoridation and large changes in the refractive index in the core. For this reason, the optical fiber of Patent Document 5 is not suitable for long-haul transmission, because it is difficult for the optical fiber to achieve a transmission loss smaller than 0.17 dB/km. In the optical fiber of the first embodiment, on the other hand, two acoustic cores are formed by the concentration distribution of the metallic dopant from the core 11a to the cladding 12a. Accordingly, the optical fiber of the first embodiment can solve the problem described above, and can achieve a transmission loss smaller than 0.17 dB/km.

First Comparative Example

Figure 3:
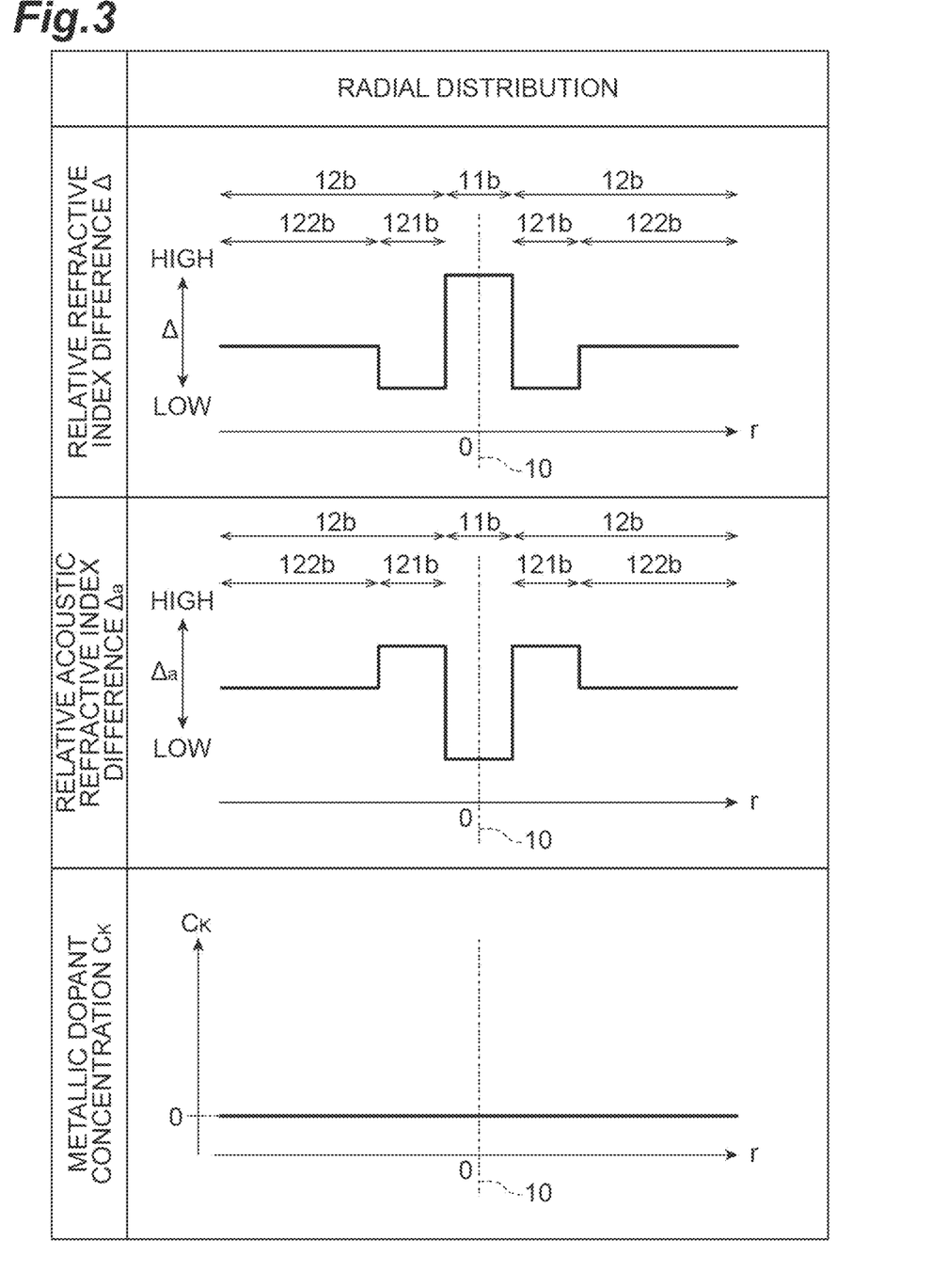
FIG. 3 is a diagram showing the respective radial distributions of the relative optical refractive index difference Δ, the relative acoustic refractive index difference Δa, and the metallic dopant concentration $C_K$ in an optical fiber according to a first comparative example.

FIG. 3 is a diagram showing the respective radial distributions of the relative optical refractive index difference Δ, the relative acoustic refractive index difference Δa, and the metallic dopant concentration $C_K$ in an optical fiber according to a first comparative example. The optical fiber according to the first comparative example has the same cross-sectional structure as that of the optical fiber 1 shown in FIG. 1. Note that the radial distributions shown in FIG. 3 correspond to the radial distributions in a cross-section perpendicular to the fiber axis 10 in the optical fiber 1 in FIG. 1.

The optical fiber according to the first comparative example (FIG. 3) includes a core 11b and a cladding 12b. The cladding 12b includes a first cladding 121b that directly surrounds the core 11b, and a second cladding 122b that surrounds the first cladding 12 1b. The first comparative example (FIG. 3) differs from the above first embodiment (FIG. 2) in that neither the core 11b nor the cladding 12b contains a metallic dopant. As any metallic dopant is not doped, the optical fiber according to the first comparative example has an anti-guide structure in which the core 11b having a low relative acoustic refractive index difference Δa is surrounded by the cladding 12b having a high relative acoustic refractive index difference Δa. In this anti-guide structure, there is a plurality of acoustic modes that are weakly confined, as shown in FIGS. 15A and 15B of Patent Document 5. Further, as the sound velocities of these acoustic modes are substantially equal, the Brillouin gain spectrum does not expand, and, as a result, SBS is not reduced in the first comparative example.

Second Comparative Example

Figure 4:
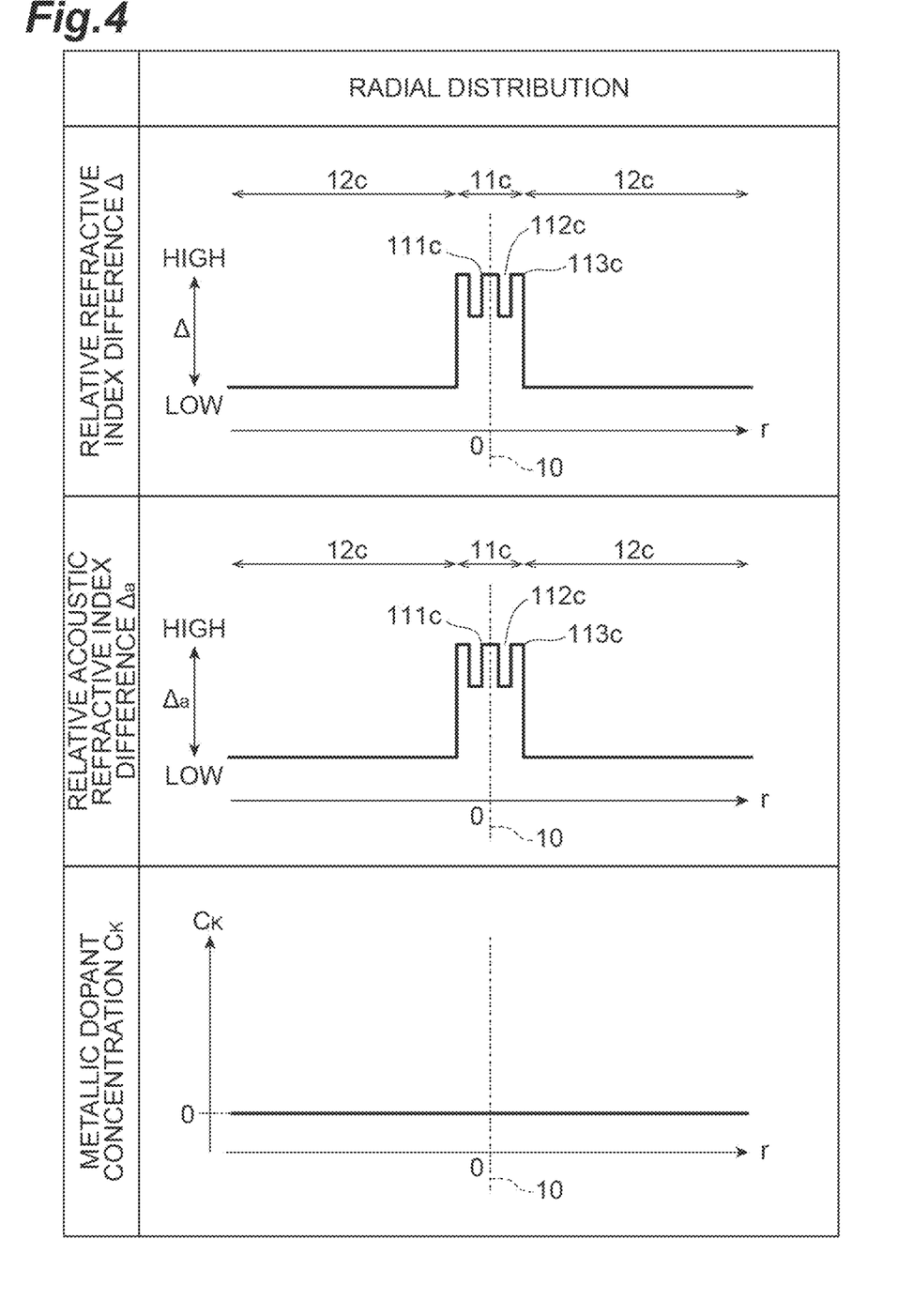
FIG. 4 is a diagram showing the respective radial distributions of the relative optical refractive index difference Δ, the relative acoustic refractive index difference Δa, and the metallic dopant concentration $C_K$ in an optical fiber according to a second comparative example.

FIG. 4 is a diagram showing the respective radial distributions of the relative optical refractive index difference Δ, the relative acoustic refractive index difference Δa, and the metallic dopant concentration $C_K$ in an optical fiber according to a second comparative example. The optical fiber according to the second comparative example has the same cross-sectional structure as that of the optical fiber 1 shown in FIG. 1. Note that the radial distributions shown in FIG. 4 correspond to the radial distributions in a cross-section perpendicular to the fiber axis 10 in the optical fiber 1 in FIG. 1.

The optical fiber according to the second comparative example (FIG. 4) includes a core 11c and a cladding 12c. The core 11c includes a central core 111c having a high relative acoustic refractive index difference Δa, a first annular core 112c having a low relative acoustic refractive index difference Δa, and a second annular core 113c having a high relative acoustic refractive index difference Δa, depending on the radial distribution of the concentration of the dopant (Ge, F, Al, or the like, for example). As the relative acoustic refractive index difference Δa is high at two points of the central core 111c and the second annular core 113c of the core 11c, some of the acoustic modes are localized at the central core 111c, and the other acoustic modes are localized at the second annular core 113c. Since these acoustic modes have different sound velocities, the Brillouin gain spectrum expands, and SBS is reduced. However, the core 11c contains Ge, and the spatial non-uniformity in the refractive index is large in the core 11c, as described above. Therefore, the optical fiber according to the second comparative example has a high transmission loss, and it is difficult for this optical fiber to achieve a transmission loss smaller than 0.17 dB/km.

Note that, in the first embodiment (FIG. 2) described above, it is important that a metallic dopant for lowering the sound velocity be doped, and the concentration of the metallic dopant be spatially non-uniform in the first cladding 121a. As for the method for forming such a concentration distribution of a metallic dopant, it is useful to adopt a method for diffusing the metallic dopant from the core 11a to the first cladding 121a in the drawing process for manufacturing an optical fiber by drawing one end of the preform having the metallic dopant doped to the core 11a while heating the preform, as already known. However, such a method normally has a problem that the metallic dopant concentration at the boundary between the core 11a and the first cladding 121a might become lower, because the metallic dopant can be widely diffused from the core 11a to the outer periphery of the first cladding 121a under a high-temperature environment during the drawing process.

Therefore, it is preferable to add high-concentration fluorine to the portion of the preform to be the first cladding 121a, to slow down the diffusion of the metallic dopant in the first cladding 121a during the drawing process. Particularly, it is preferable that the portion of the preform to be the first cladding 121a contains 5000 ppm or more of fluorine on average. Further, where a(A) represents the distance between the innermost position at which the metallic dopant concentration in the cladding 12a lowers to a ratio A of the reference concentration (the position closest to the fiber axis 10) and the core-cladding boundary, with the reference concentration being the concentration of the metallic dopant on the boundary between the core 11a and the cladding 12a, it is preferable to satisfy a(0.1)≥5 μm, or more preferably, a(0.1)≥10 μm. In this case, an acoustic core is formed, and the line width of the Brillouin gain is expanded. At this stage, the concentration of the metallic dopant at the core-cladding boundary is preferably 1 ppm or higher.

Second Embodiment

Figure 5:
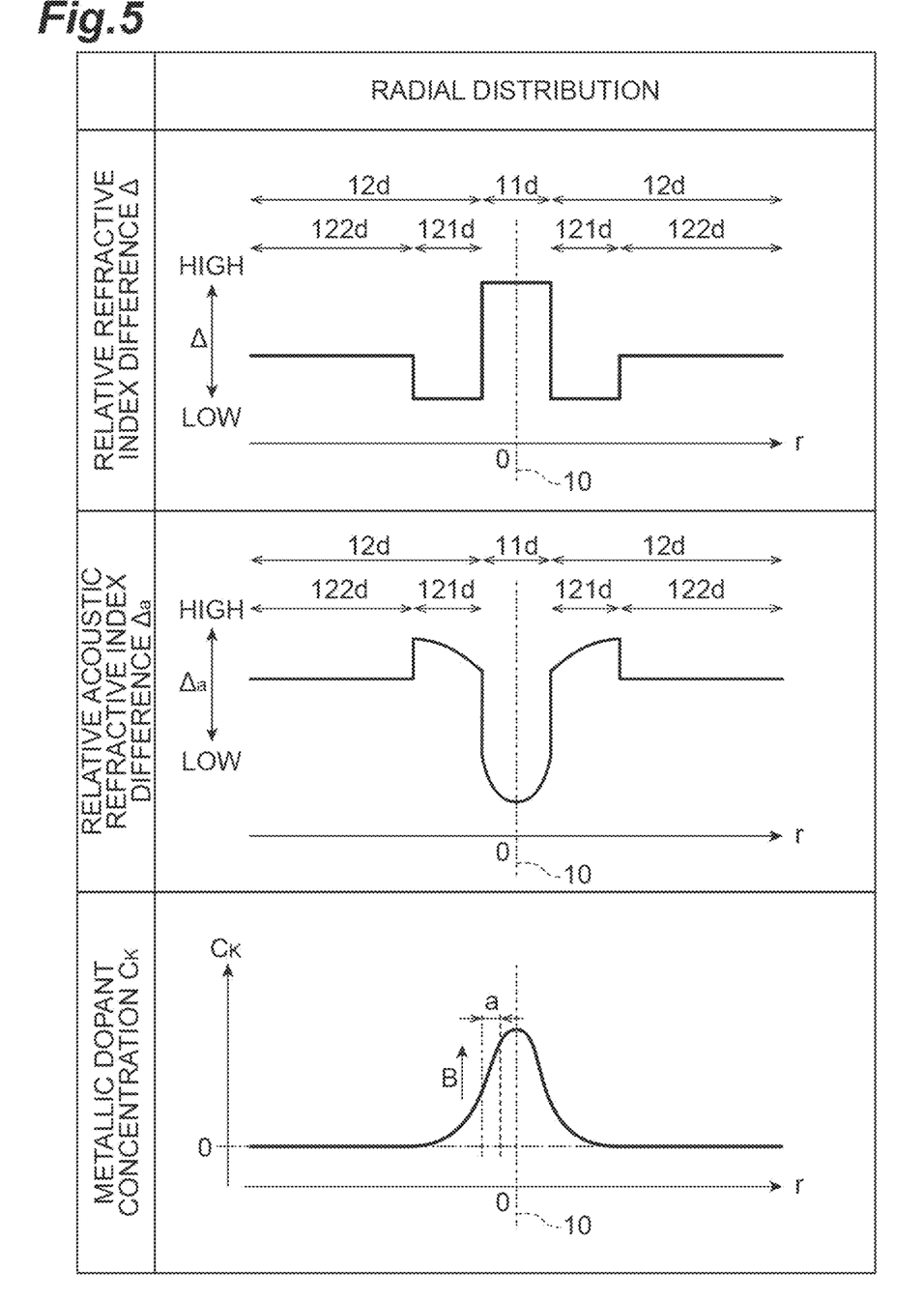
FIG. 5 is a diagram showing the respective radial distributions of the relative optical refractive index difference Δ, the relative acoustic refractive index difference Δa, and the metallic dopant concentration $C_K$ in an optical fiber of a second embodiment.

FIG. 5 is a diagram showing the respective radial distributions of the relative optical refractive index difference Δ, the relative acoustic refractive index difference Δa, and the metallic dopant concentration $C_K$ in an optical fiber according to a second embodiment. The optical fiber according to the second embodiment has the same cross-sectional structure as that of the optical fiber 1 shown in FIG. 1. However, the metallic dopant contained in the optical fiber according to the second embodiment has the effect of increasing the sound velocity and reducing the relative acoustic refractive index difference. As such dopants, lithium and magnesium are known, for example. Note that the radial distributions shown in FIG. 5 correspond to the radial distributions in a cross-section perpendicular to the fiber axis 10 in the optical fiber 1 in FIG. 1.

The optical fiber according to the second embodiment (FIG. 5) includes a core 11d and a cladding 12d. The cladding 12d includes a first cladding 121d that directly surrounds the core 11d, and a second cladding 122d that surrounds the first cladding 121d. The magnitude relationship between these glass regions in terms of the relative optical refractive index difference Δ, and the fluorine concentration for achieving the relationship are the same as those in the first embodiment. The relative optical refractive index differences and the radius ratios of the respective glass regions are also the same as those in the first embodiment.

The metallic dopant is widely distributed in both the core 11d and the first cladding 121d. The distribution of the metallic dopant concentration $C_K$ has such a shape as to have a maximum value substantially at the center (the fiber axis 10) of the core 11d and decrease in the radial direction in the core 11d and the first cladding 121d. The metallic dopant in the second embodiment raises the sound velocity V of the silica glass as opposed to fluorine, to reduce the relative acoustic refractive index difference Δa.

In the second embodiment, in the glass region including the boundary between the core 11d and the cladding 12d, the local sound velocity drops in the direction from the side of the core 11d toward the side of the cladding 12d. Also, in the core 11d and the cladding 12d, the local sound velocity changes continuously in the radial direction. Further, the line width of the Brillouin gain of the guided light beam in the fundamental mode is 60 MHz or more. The position of the edge portion farthest from the fiber axis at a portion of the doped region in which the concentration of the metallic dopant in the core 11d becomes twice or more higher than the concentration of the metallic dopant at the boundary is preferably at a distance of 5 μm or more from the boundary. That is, where a(B) represents the distance between the outermost position at which the metallic dopant concentration in the core 11d increases to a ratio B of the reference concentration (the position farthest from the fiber axis 10) and the core-cladding boundary, with the reference concentration being the concentration of the metallic dopant on the boundary between the core 11d and the cladding 12d, it is preferable to satisfy a(2)≥5 μm. Further, the concentration of the metallic dopant at the boundary is preferably 0.1 ppm or higher.

As shown in FIG. 5, the distribution of the relative acoustic refractive index difference Δa has such a shape as to have a minimum value at the center (the fiber axis 10) of the core 11d, and increase in the radial direction in the core 11d and in the cladding 12d adjacent to the core 11d. Because of this, the sound velocity in the core and in the cladding adjacent to the core becomes non-uniform as disclosed in Patent Documents 2 and 3 mentioned above. That is, as the line width of Brillouin gain expands, SBS is reduced.

In Patent Documents 2 and 3 mentioned above, fluorine and aluminum, as well as germanium, are non-uniformly doped to the core. However, these dopants increase loss due to scattering and absorption. Therefore, the optical fibers of Patent Documents 2 and 3 are not suitable for long-haul transmission, because it is difficult for these optical fibers to achieve a transmission loss smaller than 0.17 dB/km. In the second embodiment, on the other hand, the metallic dopants that reduce Rayleigh scattering are non-uniformly distributed in the core 11d, so that non-uniformity of the sound velocity is formed. Accordingly, the optical fiber of the second embodiment can solve the problem described above, and can achieve a transmission loss smaller than 0.17 dB/km.

The stimulated Brillouin scattering (SBS) to be reduced in an optical fiber of the present disclosure is an interaction among the light beam being guided in a first direction (first guided light beam), the light beam being guided in a second direction that is the reverse of the first direction (second guided light beam), and the acoustic waves propagating in the first direction. In an optical fiber having a core and a cladding that are mainly comprised of silica glass, acoustic waves having a frequency of about 11 GHz have a role in SBS.

Meanwhile, guided acoustic wave Brillouin scattering (GAWBS) disclosed in Non-Patent Documents 1 and 2 is a phenomenon in which the light being guided in the first direction by the acoustic waves thermally existing in an optical fiber is scattered as noise light propagating in the first direction. In an optical fiber having a core and a cladding that are mainly comprised of silica glass, acoustic waves having a frequency of 0.1 to 0.5 GHz have a role in GAWBS.

In long-haul transmission, not only SBS but also GAWBS is a noise source. Therefore, it is also important to reduce GAWBS. The acoustic waves that cause GAWBS propagates through the whole of the core and the cladding of an optical fiber mainly comprised of silica glass. It is effective to attenuate the acoustic waves. For that purpose, it is important to increase the loss tangent tans, which represents the height of energy loss in the first coating layer that directly surrounds the silica glass. The loss tangent tan δ is calculated as the ratio between loss elastic modulus and storage elastic modulus. The first coating layer normally has a Young's modulus of 0.1 to 1 MPa, and preferably also has a loss tangent tan δ of 0.3 or more, or more preferably 0.4 or more. Thus, GAWBS can be reduced.

REFERENCE SIGNS LIST

1 . . . Optical fiber; 10 . . . Fiber axis; 11, 11a to 11d . . . Core; 12, 12a to 12d . . . Cladding; 121a to 121d . . . First cladding; 122a to 122d . . . Second cladding; 13 . . . First coating layer; and 14 . . . Second coating layer.

The invention claimed is:

1. An optical fiber comprising:
a core extending along a fiber axis and mainly comprised of silica glass;
a cladding surrounding the core and mainly comprised of silica glass, the cladding having a refractive index lower than a refractive index of the core; and
a coating layer comprised of a resin material, the coating layer surrounding the cladding,
wherein,
in a glass region including a boundary between the core and the cladding, a local sound velocity decreases in a direction from a side of the core toward a side of the cladding,
at least in the cladding, the local sound velocity changes continuously in a radial direction from the fiber axis toward an outer peripheral surface of the cladding, and
a Brillouin gain of a light beam guided by a fundamental mode has a line width of 60 MHz or more.

2. The optical fiber according to claim 1, wherein
a concentration of fluorine in the cladding is higher than a concentration of fluorine in the core, and
the cladding contains a metallic dopant that reduces sound velocity, and a concentration of the metallic dopant in the cladding decreases continuously in the radial direction.

3. The optical fiber according to claim 2, wherein
the optical fiber has an edge portion closest to the fiber axis and being a part of a doped region in which a concentration of the metallic dopant drops in the cladding to 0.1 times a concentration of the metallic dopant at the boundary, and a position of the edge portion is separated from the boundary by 5 μm or more in the radial direction.

4. The optical fiber according to claim 3, wherein
the concentration of the metallic dopant at the boundary is 0.1 ppm or higher.

5. The optical fiber according to claim 1, wherein
a concentration of fluorine in the cladding is higher than a concentration of fluorine in the core, and
both the core and the cladding contain a metallic dopant that increases sound velocity, and a concentration of the metallic dopant in the core and the cladding decreases continuously in the radial direction.

6. The optical fiber according to claim 1, wherein
the core is provided without substantially containing $GeO_2$.

7. The optical fiber according to claim 1, wherein
a minimum transmission loss of the light beam guided by the fundamental mode is 0.17 dB/km or less.

8. The optical fiber according to claim 1, wherein
the coating layer includes a plurality of layers, and a loss tangent tan δ in an innermost layer of the plurality of layers is 0.3 or more.

* * * * *